INVENTOR
RICHARD C. STANLEY
BY Kimmel & Crowell
ATTORNEYS

Nov. 14, 1961 R. C. STANLEY 3,009,048
INTERNAL PIPE WELDING APPARATUS
Filed Feb. 27, 1958 6 Sheets-Sheet 3

INVENTOR
RICHARD C. STANLEY
BY *Kimmel & Crowell*
ATTORNEYS

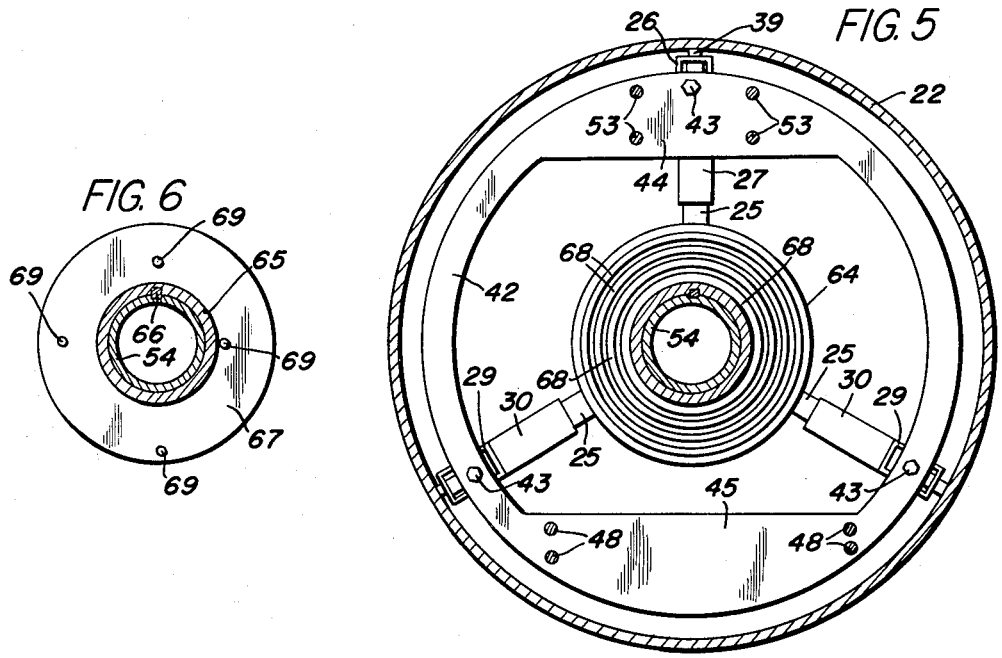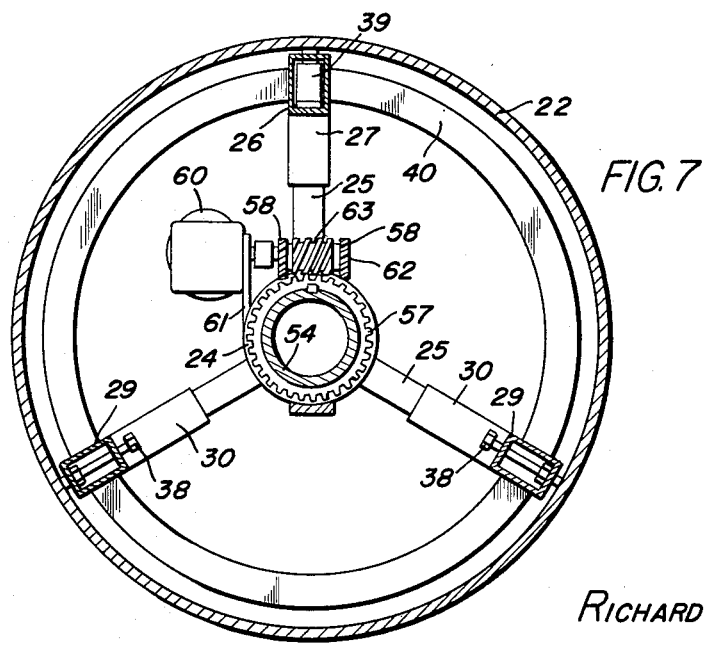

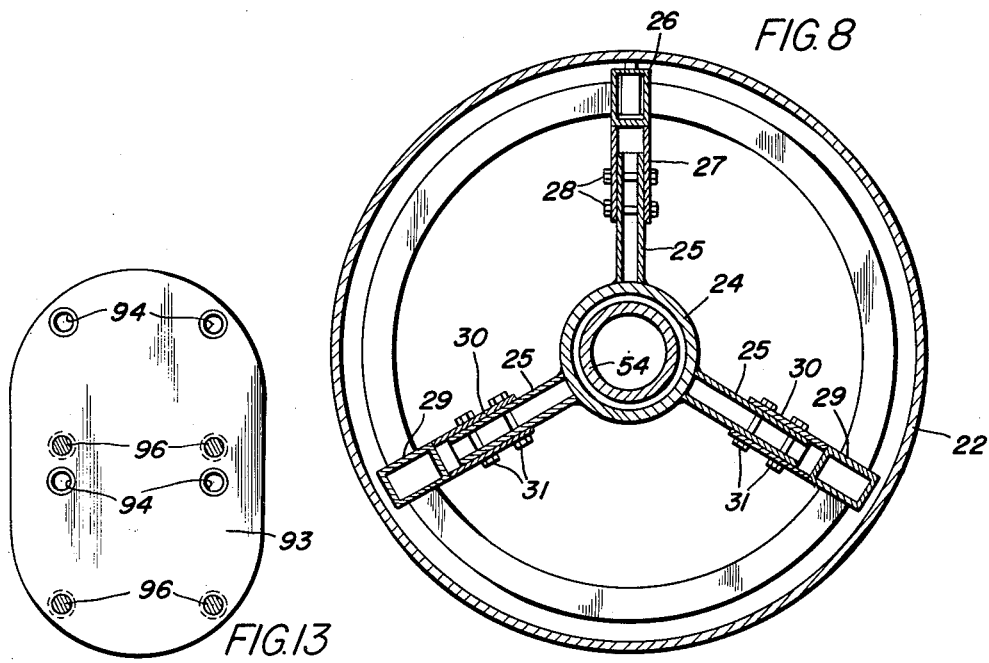
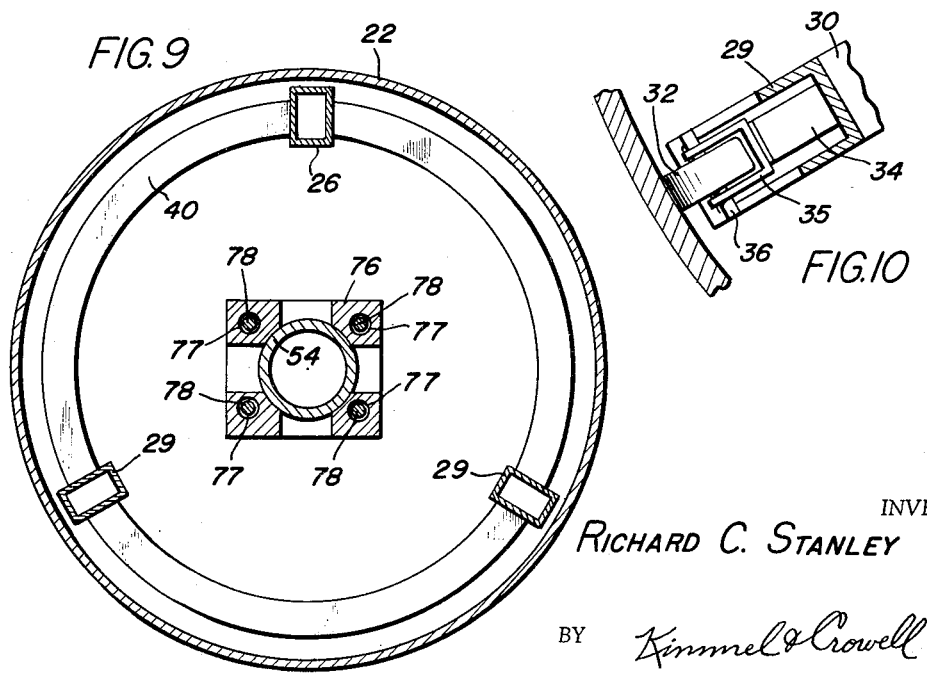

Nov. 14, 1961  R. C. STANLEY  3,009,048
INTERNAL PIPE WELDING APPARATUS
Filed Feb. 27, 1958  6 Sheets-Sheet 6
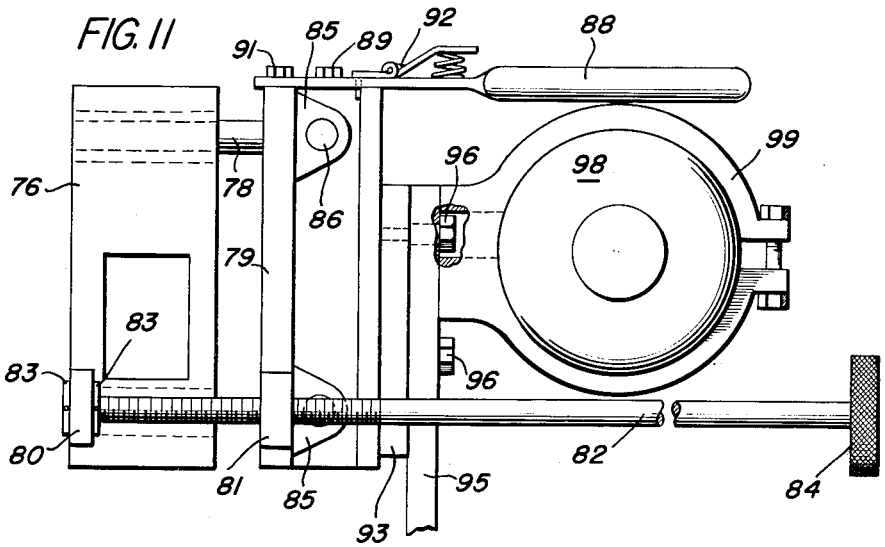
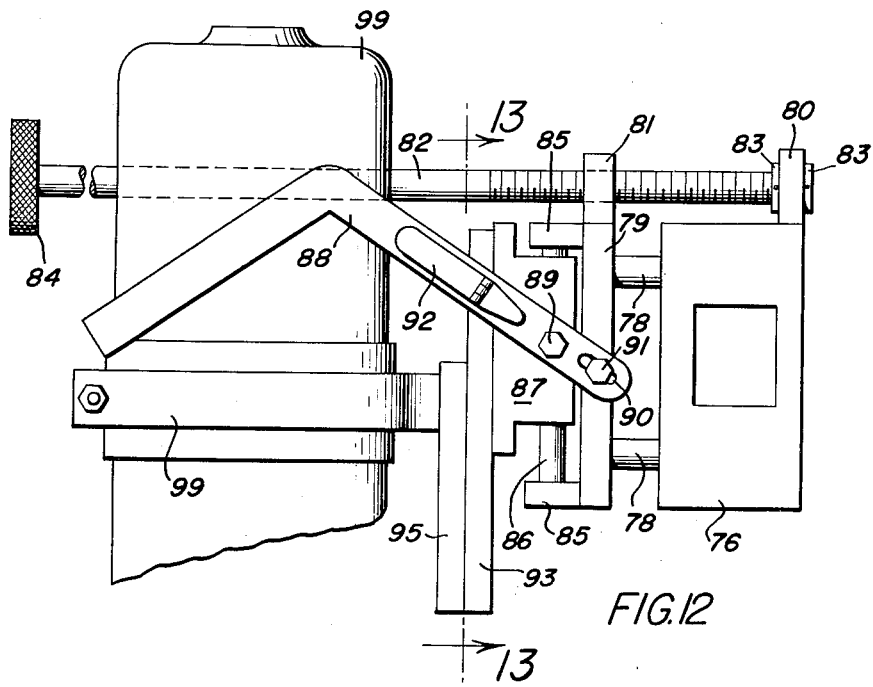
INVENTOR
RICHARD C. STANLEY
BY Kinnel & Crowell
ATTORNEYS

United States Patent Office 3,009,048
Patented Nov. 14, 1961

3,009,048
INTERNAL PIPE WELDING APPARATUS
Richard Carl Stanley, Gadsden, Ala., assignor to Midwestern Welding Company, Tulsa, Okla., a limited partnership
Filed Feb. 27, 1958, Ser. No. 717,912
5 Claims. (Cl. 219—60)

The present invention relates to internal pipe welding apparatus, and particularly to apparatus for automatically welding the joint between adjacent pipes.

The primary object of the invention is to provide pipe welding apparatus for internally welding seams in pipes automatically with the pipe being rotated during the welding operation.

Another object of the invention is to provide pipe welding apparatus of the class described above in which the pipe is electrically welded and in which the welding operation takes place at the lowermost point of the pipe circumference as the pipe is being rotated.

Another object of the invention is to provide pipe welding apparatus of the class described above in which means are provided for rotating the welding apparatus with respect to the rotating pipe so as to maintain the welding operation at the lowermost point in the circumference of the pipe.

A still further object of the invention is to provide a pipe welding apparatus of the class described above in which means are provided for adjusting the welding gap and the longitudinal position thereof to maintain the weld within the pipe joint.

Other objects and advantages will become apparent in the following specification when considered in the light of the attached drawings, in which:

FIGURE 5 is a vertical sectional view taken along the line 5—5 of FIGURE 1, looking in the direction of the arrows.

FIGURE 6 is a fragmentary vertical sectional view taken along the line 6—6 of FIGURE 1, looking in the direction of the arrows.

FIGURE 7 is a vertical sectional view taken along the line 7—7 of FIGURE 1, looking in the direction of the arrows.

FIGURE 8 is a vertical sectional view taken along the line 8—8 of FIGURE 1, looking in the direction of the arrows.

FIGURE 9 is a vertical sectional view taken along the line 9—9 of FIGURE 1, looking in the direction of the arrows.

FIGURE 10 is an enlarged fragmentary vertical section taken along the line 10—10 of FIGURE 1, looking in the direction of the arrows.

FIGURE 11 is an enlarged fragmentary top plan view of the welding rod adjusting apparatus.

FIGURE 12 is a fragmentary side elevation of the structure illustrated in FIGURE 11.

FIGURE 13 is a fragmentary vertical cross-section taken along the line 13—13 of FIGURE 12, looking in the direction of the arrows.

Figure 1:
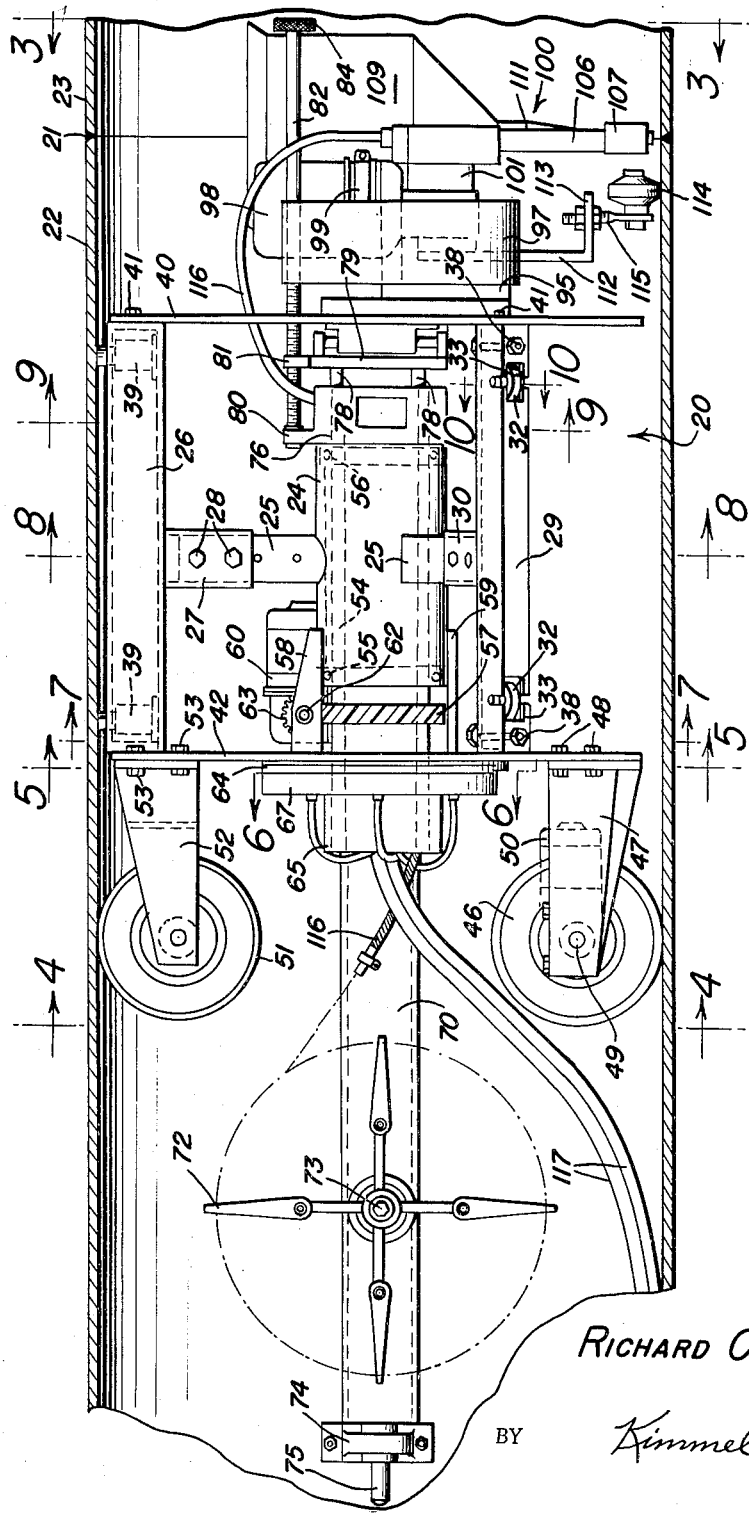
FIGURE 1 is a side elevation of the invention in welding position in a pipe with the pipe shown broken away and in section for convenience of illustration.

Referring now to the drawings in detail wherein like reference characters indicate like parts throughout the several figures, the reference numeral 20 indicates generally an internal pipe welding mechanism constructed in accordance with the invention.

The pipe welding mechanism 20 is adapted to apply an internal weld to a joint 21 between abutting ends of pipes 22, 23. The mechanism includes a longitudinally extending cylindrical frame 24.

The frame 24 is provided with three equispaced radially extending generally rectangular supports 25. A hollow bar 26 has a radially inwardly extending rectangular socket 27 fixed thereto and telescoped over the uppermost of the supports 25. A pair of bolts 28 secures the socket 27 to the support 25.

A hollow bar 29 is positioned adjacent the end of each of the lower supports 25 and each are provided with a rectangular socket 30 telescoped over the respective support 25 and secured thereto by bolts 31. A support roller 32 extends through a slot 33 adjacent each end of each of the hollow bars 29. Each of the rollers 32 are resiliently supported on springs 34 engaging a roller encompassing yoke 35, as best seen in FIGURE 10.

A shaft 36 on which the roller 32 is journalled engages through slots 37 formed in the sides of the hollow bars 29. Each end of each of the hollow bars 29 are provided with pipe engaging bolts 38. The bolts 38 are radially adjustable to center the tubular frame 24 with respect to the pipe 22.

The hollow bar 26 is provided with an upwardly extensible hydraulic jack 39 at each end thereof to force the bars 29 downwardly compressing the springs 34 until the bolts 38 come in contact with the pipe 22 when the tubular frame 24 is centered.

The forward end of the bars 26, 29 are joined by an annular ring 40 detachably secured thereto by bolts 41. The rear ends of the bars 26, 29 are connected by an annular ring 42 secured thereto by means of bolts 43. The ring 42 is provided with an upper widened portion 44, and a lower widened portion 45, for reasons to be assigned.

A pair of supporting and drive wheels 46 are mounted between bracket arms 47 secured in spaced parallel relation to opposite sides of the lower widened portion 45 by means of bolts 48. The wheels 46 are positioned in spaced parallel relation on a shaft 49 and a drive motor 50 is operatively connected with the shaft 49 intermediate the wheels 46. The wheels 46 engage the pipe 22 and are adapted to support the welding mechanism 20 for movement into and out of the pipe 22.

A wheel 51 is arranged adjacent the upper widened portion 44 of the ring 42 and is journalled on a pair of bracket arms 52 secured to the upper widened portion 44 by means of bolts 53. The wheel 51 engages the pipe 22 in diametrically opposed position to the wheels 46 and assists in supporting the welding mechanism 20 for passage into and out of the pipe 22.

An elongated tubular shaft 54 is concentrically arranged in the tubular frame 24 and journalled therein on bearings 55, 56 at the opposite ends of the tubular frame 24. The tubular shaft 54 extends rearwardly beyond the tubular frame 24 and has a gear 57 fixedly secured thereto in rearwardly spaced relation from the rear end of the tubular frame 24. A pair of spaced parallel arms 58 are secured to the tubular frame 24 and extend rearwardly therefrom. An arm 59 is fixedly secured to the tubular frame 24 oppositely of the arms 58 and extends rearwardly in parallel relation to the arms 58.

A motor 60 is mounted adjacent the frame 24 on a bracket 61 fixedly secured to the frame 24. The motor 60 has a shaft 62 extending laterally therefrom and journalled in the arms 58, as best seen in FIGURES 1 and 7.

A worm gear 63 is fixed to the shaft 62 intermediate the arms 58 in meshing relation with the gear 57. A disk 64 is fixedly secured to the rear ends of the arms 58 and 59 in perpendicularly extending relation to the axis of the tubular frame 24.

A cylindrical hub 65 encompasses the rear end of the tubular shaft 54 and is keyed thereto by a key 66 so that the hub 65 turns with the tubular shaft 54. A flange like disk 67 is integrally formed with the hub 65 in closely adjacent relation to the disk 64.

The disk 64 is provided with a plurality of concentric contact rings 68 arranged on the rear face thereof and the disk 67 is provided with a plurality of spring pressed contact lugs 69 arranged on the forward face thereof at varying distances from the center of the disk 67 so as to contact each of the concentric contact rings 68 individually.

An elongated horizontal channel bar 70 has its forward end secured to the flange disk 67 and is connected by a bracket 71 to the hub 65.

A reel 72 is journalled on a horizontally extending shaft 73 supported on the channel bar 70 rearwardly of the ring 42.

An offset bracket 74 is secured to the rear end of the channel bar 70 and secures the forward end of a towing handle 75 to the channel bar 70 in alignment with the axial center of the rings 40, 42.

A generally rectangular block 76 is fixed to the forward end of the tubular shaft 54 adjacent the tubular frame 24. The block 76 is provided with a plurality of longitudinally extending bores 77, and a guide pin 78 is slidably mounted in each of the bores 77 in spaced parallel relation. An upright mounting plate 79 is fixedly secured to the forward end of the pins 78 in spaced relation to the block 76.

The block 76 is provided with an upstanding ear 80 adjacent the rear edge thereof, and the mounting plate 79 is provided with an upstanding ear 81 arranged in aligned relation to the ear 80. A longitudinally extending horizontal shaft 82 is threaded through the ear 81 and is journalled in the ear 80 by means of collars 83 engaging opposite sides of the ear 80. The shaft 82 is provided with a hand wheel 84 at its forward end.

The mounting plate 79 is provided with upper and lower pairs of forwardly extending ears 85 and a pair of vertically extending spaced parallel guide rods 86 are supported by the ears 85 forwardly of the mounting plate 79.

A generally rectangular block 87 is engaged over the guide rods 86 for vertical sliding movement thereon between the ears 85. A hand lever 88 is pivoted at 89 to the block 87 and is provided with a slot 90 adjacent its rear end through which a bolt 91 extends securing the rear end of the hand lever 88 to the mounting plate 79. A spring pressed latch 92 is mounted on the hand lever 88 and is arranged to engage in the block 87 to lock the hand lever 88 in the position illustrated in FIGURE 12.

Figure 2:
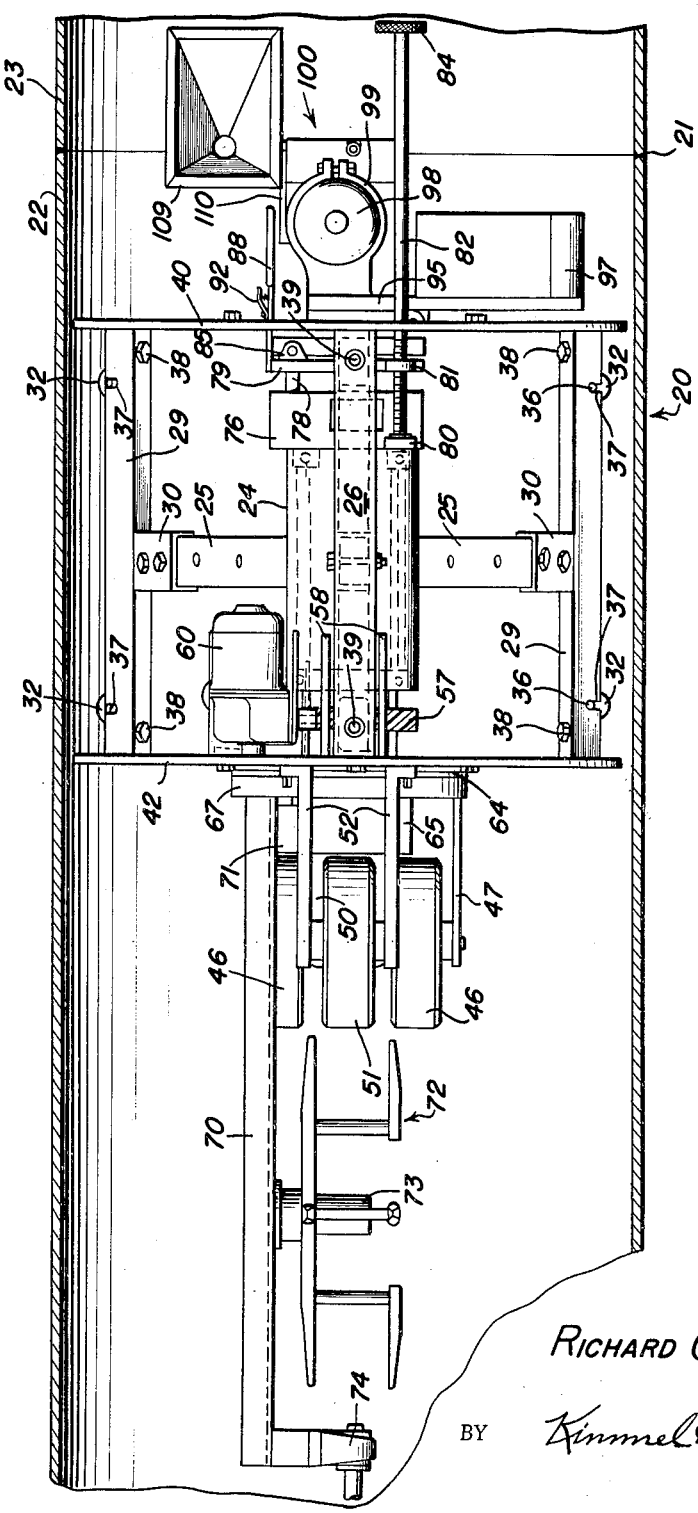
FIGURE 2 is a top plan view of the invention shown in welding position in a pipe with the pipe shown broken away and in section for convenience of illustration.
Figure 3:
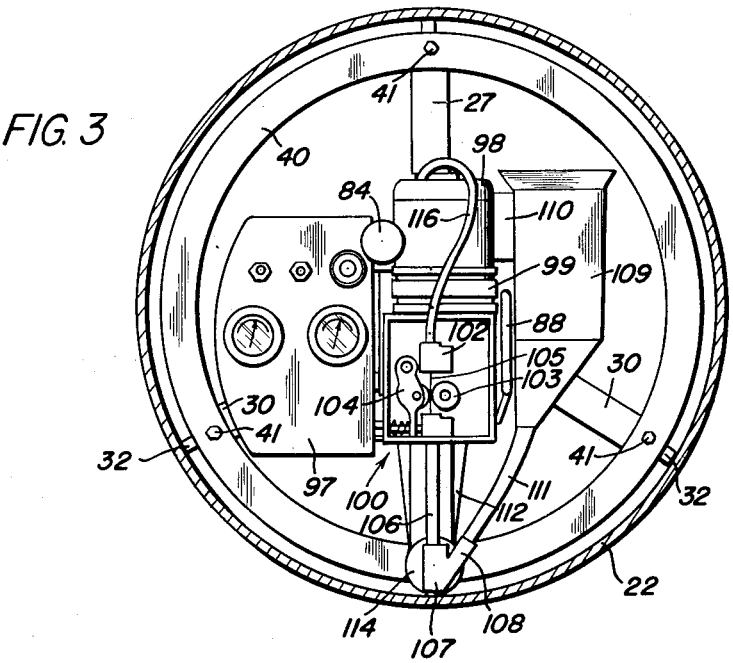
FIGURE 3 is a vertical sectional view taken along the line 3—3 of FIGURE 1, looking in the direction of the arrows.
Figure 4:
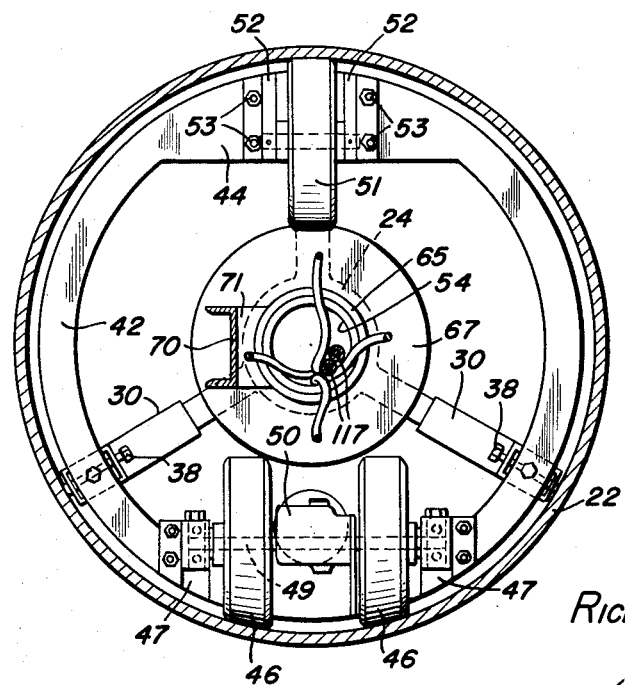
FIGURE 4 is a vertical sectional view taken along the line 4—4 of FIGURE 1, looking in the direction of the arrows.

An adapter plate 93 is secured to the block 87 by means of bolts (not shown) extending through bores 94 in the adapter plate 93. A motor support plate 95 is secured to the adapter plate 93 by means of bolts 96. The motor mounting plate 95 extends a substantial distance laterally from the adapter plate 93 and supports a control box 97, as best seen in FIGURES 1 and 2.

An electric motor 98 is secured to the motor support plate 95 by means of a clamping ring 99.

A welding rod feed mechanism generally indicated at 100 is secured to the motor 98 by means of a bracket 101. The welding rod feed mechanism 100 includes a welding rod guide 102, a drive roller 103 driven by the motor 98, and a resilient pressure roller 104 clamping the welding rod 105 to the drive roller 103.

A tube 106 is secured to the welding rod feed mechanism 100 and depends therefrom. A fitting 107 is secured to the lower end of the tube 106 and is provided with a flux inlet portion 108. A flux hopper 109 is mounted on a bracket 110 extending from the motor 98 and has a conduit 111 extending downwardly therefrom and connecting to the flux inlet portion 108 of the fitting 107. A motor support arm 112 is secured to the motor 98 and extends downwardly therefrom. A horizontal offset 113 is integrally secured to the lower end of the arm 112 and has a motor support roller 114 secured thereto for vertical adjustment on a threaded shaft 115.

The welding rod 105 is wound on the reel 72 and extends through a flexible housing 116 which extends through the tubular shaft 54. The flexible housing 116 is anchored at its forward end to the guide 102 and at its rear end to the channel bar 70. Power cables 117 extend through the tubular shaft 54 to provide electric power for the motor 98, the welding rod 105, and the control box 97, all in a conventional manner.

The motor 60 receives electric energy from the control box 97 through the contact lugs 69 and contact rings 68 so that the motor 60 may revolve with respect to the control box 97 while remaining in electric contact therewith.

In the use and operation of the invention, the internal welding apparatus 20 is supported on the rollers 32 and the wheels 46, 51 within the pipe 22. The jacks 39 are retracted and the roller 114 is held out of contact with the pipe 22 by means of the latch 92 on the hand lever 88. The motor 50 is energized in a forward direction and the wheels 46 drive the welding apparatus 20 forwardly within the pipe 22.

On reaching the position illustrated in FIGURE 1, with the tube 106 in approximate alignment with the joint 21 between adjacent pipes 22, 23, the forward motion of the welding apparatus 20 is halted and the jacks 39 are operated to force the bolts 38 into contact with the inner surface of the pipe 22. With the jacks 39 pressing against the inner surface of the pipe 22, and the bolts 38 likewise pressing thereagainst, the welding apparatus 20 is locked to the pipe 22.

The pipes 22, 23 are mounted on an apparatus (not shown) for turning the pipes 22, 23 axially with the welding apparatus 20 locked therein. The tubular shaft 54 is rotated by the motor 60 at the same speed as the pipe 22 is rotated so that the tubular shaft 54 in effect remains stationary while the pipes 22, 23 are turning.

The welding rod feed mechanism 100, flux hopper 109, control box 97, block 76, and mounting plate 79 at the forward end of the tubular shaft 54 all are fixed to the tubular shaft 54 and revolve therewith. The channel bar 70, disk 67, reel 72, and bracket 74 are all fixed to the rear end of the tubular shaft 54 and revolve therewith.

The revolving of the welding rod 105 with respect to the revolving pipe 22 maintains the point of contact between the welding rod 105 and the pipe 22 at the lowermost point of the pipe 22 so that the welding rod 105 overlies the weld at all times.

After the welding apparatus 20 has been positioned with the tube 106 close to the joint 21, the mounting plate 79 is adjusted by means of the threaded shaft 82 and hand wheel 84 to exactly position the welding rod 105 with respect to the joint 21 longitudinally in the pipe 22.

The motor 98 drives the drive roller 103 and moves the welding rod 105 downwardly in the tube 106 to compensate for the melting away of the welding rod 105 during the welding operation. The welding rod 105 is supported in spaced relation with respect to the inner surface of the pipe 22 by means of a roller 114 which engages the inner surface of the pipe 22.

In the case of irregularities in the inner surface of the pipe 22, the roller 114 floats the welding rod 105 the correct distance from the inner surface of the pipe 22.

The hand lever 88 is also used for locking the roller 114 out of contact with the pipe 22 when moving the welding apparatus 20 longitudinally through the pipe 22.

The control box 97 is provided with complete controls for operating the motor 60, the motor 98, and the external drive motors (not shown) of the pipe rotating apparatus (not shown) so that the operator of the welding apparatus 20 within the pipe 22 is in complete control of the welding operation.

The flux hopper 109 and conduit 111 automatically feeds flux to the fitting 107 to provide flux at the point of the weld. It should be understood that the welding operation carried on by the welding apparatus 20 is to provide an internal bead at the joint 21 between a pair of pipes 22, 23 which have been welded together externally.

The apparatus 20 illustrated in the drawings is shown as used in a thirty inch pipe, and it should be understood that by replacing the rings 40, 42, hollow bars 26, 29, and by bolting the motor support plate 95 directly to the block 87, eliminating the adapter plate 93, the welding apparatus 20 can be converted for use in twenty-four inch pipes with equal facility.

Obviously, by proceeding as outlined for the twenty-four inch pipe, the welding apparatus 20 can be utilized in conventional cross-country pipe lines without modification of the basic structure or the principles of operation.

Having thus described the preferred embodiments of the invention, it should be understood that numerous structural modifications and adaptations may be resorted to without departing from the scope of the appended claims.

What is claimed is:

1. An internal joint welding apparatus for rotating pipe comprising a tubular frame, means mounted on said tubular frame engaging the inner surface of said pipe supporting said tubular frame for longitudinal movement in said pipe, means on said tubular frame detachably securing said tubular frame to said pipe, a longitudinally extending tubular shaft supported in said tubular frame, an electric welding rod feed mechanism supported on said tubular shaft at one end thereof, and means on said tubular frame for rotating said tubular shaft with respect to said tubular frame to maintain said welding rod feed mechanism stationary while said tubular frame is revolving with said pipe.

2. A device as claimed in claim 1 wherein means are provided between said welding rod feed mechanism and said tubular shaft for longitudinally adjusting said welding rod feed mechanism with respect to said tubular shaft.

3. A device as claimed in claim 1 wherein means are provided between said tubular shaft and said welding rod feed mechanism for mounting said welding rod feed mechanism for radial adjustment with respect to said tubular shaft.

4. A device as claimed in claim 1 wherein means are provided on said tubular frame for moving said welding rod feed mechanism longitudinally with respect to said tubular frame.

5. A device as claimed in claim 3 wherein said welding rod feed mechanism is radially adjusted with respect to said tubular shaft by means of an adjustable pipe contacting roller mounted on said welding rod feed mechanism.

References Cited in the file of this patent

UNITED STATES PATENTS

| | | |
|---|---|---|
| 1,679,499 | Rupley | Aug. 7, 1928 |
| 1,846,470 | Burnish | Feb. 23, 1932 |
| 1,991,128 | Tripp | Feb. 12, 1935 |